Patented Apr. 5, 1932

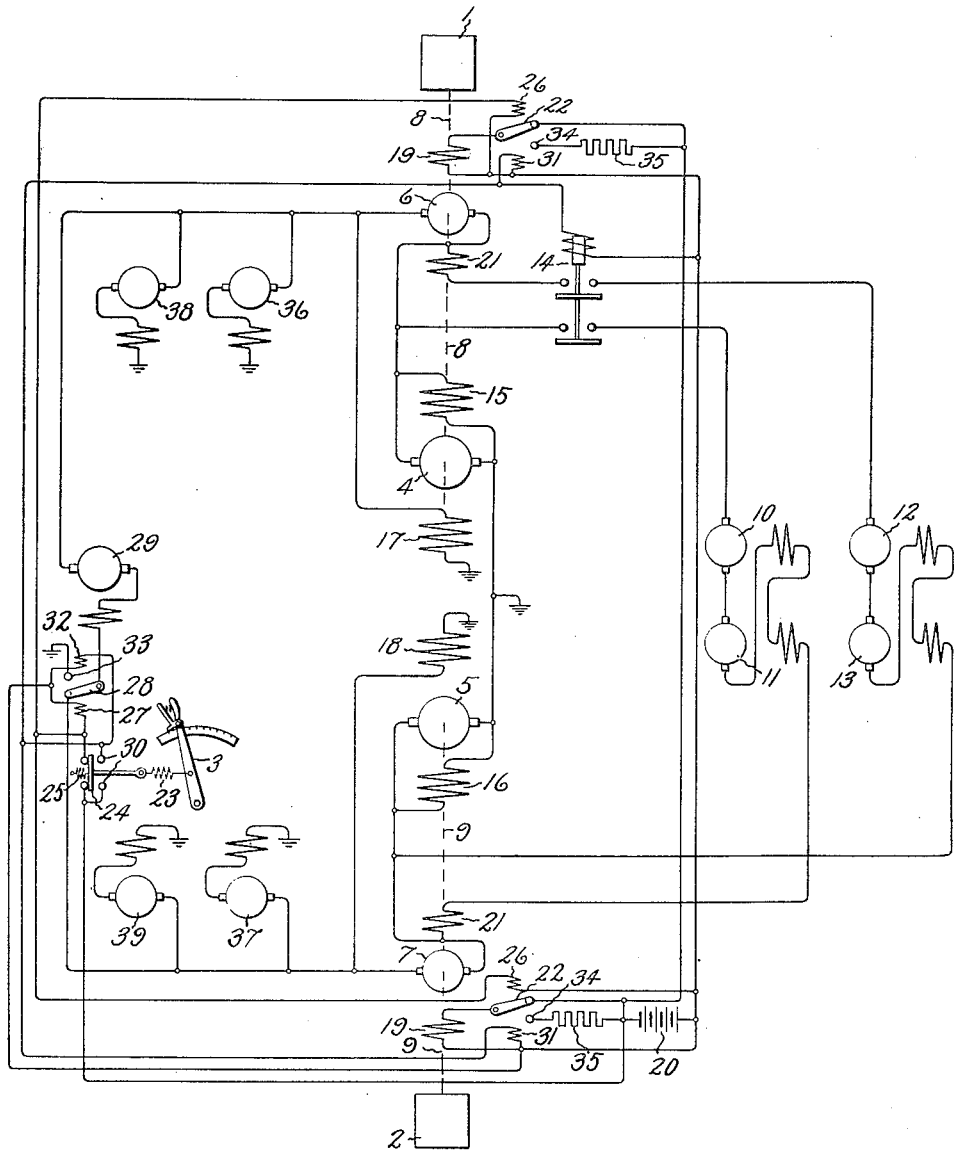

1,852,798

UNITED STATES PATENT OFFICE

ERROL W. BRANDENSTEIN, OF ERIE, PENNSYLVANIA, ASSIGNOR TO GENERAL ELECTRIC COMPANY, A CORPORATION OF NEW YORK

POWER SYSTEM

Application filed December 29, 1930. Serial No. 505,312.

My invention relates to power systems adapted for use in self-propelled vehicles wherein an engine drives a generator which in turn supplies power to electric motors arranged to drive the vehicle.

On a vehicle of this kind there are often auxiliaries, such as radiator blower motors, air compressor motors for the brake system, and blower motors for the traction motors which require a substantially constant voltage for proper operation. Most of the main generators on this type of equipment have a decidedly drooping voltage characteristic, that is, at low load current the voltage is high and at high load current the voltage is low, and therefore are unsatisfactory as a source of power supply for the auxiliaries when used alone.

An object of my invention is to provide a power system of this character with a means of obtaining a substantially constant voltage for the operaion of auxiliaries irrespective of the load on the main generator.

Another object of my invention is to provide a power system with a means of obtaining sufficient voltage when the engine is idling to operate a motor such as an air compressor motor or other auxiliaries.

I accomplish these objects by providing an engine for driving a main generator having the usual drooping voltage characteristic and supplying electrical power to a traction motor, an auxiliary generator connected in series with the main generator and having a voltage characteristic such that the sum of the voltages of the main and auxiliary generator is substantially constant irrespective of the load on the main generator, and connecting the auxiliaries across these two generators in series, so that the auxiliaries are supplied substantially constant voltage.

My invention will be better understood from the following description referring to the accompanying drawing and the features of novelty which characterize my invention will be pointed out with particularity in the claims appended to and forming a part of this specification.

In the drawing, the single figure is a schematic diagram representing the driving and auxiliary equipment of a self-propelled vehicle embodying my invention and showing the electrical connections thereof.

Referring to the drawing, the self-propelled vehicle includes engines 1 and 2 of the internal combustion or other suitable type controlled by a throttle lever 3 and coupled to the main generators 4 and 5 and the auxiliary generators 6 and 7 by shafts indicated by the dotted lines 8 and 9 respectively. In the particular embodiment of my invention shown in the drawing the main generators 4 and 5 are connected in series and supply power to two sets of traction motors 10 and 11, and 12 and 13 connected to the driving wheels of the vehicle. The motors of each set are connected in series and are of the series field type, and the two sets are connected in parallel across the two main generators 4 and 5 through a relay 14. The auxiliary generators 6 and 7 are each connected in series with the main generators 4 and 5 respectively, in such a way that the auxiliary generator acts as a booster for said main generator. By this arrangement the auxiliary generators act as series boosters to boost the voltage of the main generators and maintain a constant voltage across the series combination of main and auxiliary generators.

The excitation for the main generator is provided by two sets of fields, self-excited shunt fields 15 and 16, and cumulatively connected fields 17 and 18, which latter are each connected across one of the main and auxiliary generators in series. This arrangement provides excitation for the main generators which has somewhat the differential voltage characteristic of self-excited generators modified by the cumulative windings, which latter supply a substantially separately-excited effect as they are connected across a substantially constant source of voltage, and serve to extend the break-down point of the characteristic to high currents at low voltage. The booster generators 6 and 7 each have a separately excited field 19, supplied from a battery 20, and cumulatively connected fields 21, each in series with one of the sets of traction motors. These cumulative fields give the boosters a voltage characteristic the opposite to that of the main generators, as the greater the load current on the main generator the higher the excitation and consequently the higher the voltage of the booster, resulting in an inherent voltage characteristic which varies with and according to the load variations on the main generator. The excitation of the separately excited field 19 of the auxiliary generators is varied by relays 22, which apply full battery voltage across these fields when the engine is idling, the connections under this condition being as shown in the diagram.

The engine throttle lever 3 is connected by a spring means 23 to a switch 24. When the engine is idling a spring means 25 closes the switch 24 in the position illustrated, and thereby closes a circuit connecting the coils 26 of the relays 22 across the battery 20. When these coils 26 are energized they operate the relays 22 to the position shown in the drawing, which gives full excitation to the fields 19. This builds up the voltage of the auxiliary generators and supplies a voltage across the fields 17 and 18 of the main generators, the auxiliary generators acting as exciters in this connection when starting the engine. With the throttle lever 3 in idling position and switch 24 in the position shown, coil 27 of a relay 28 is also energized, closing the relay in the position shown, thereby completing a circuit placing a series air compressor motor 29 across the voltage of all four generators 4, 5, 6 and 7 in series. This connection gives the voltage required for the normal operation of the motor 29 when the engines 1 and 2 are idling. With this circuit the relay 14 is open so that the traction motors are disconnected from the generators.

When it is desired to start the locomotive, the throttle lever 3 is operated to control the engines and simultaneously it operates the switch 24 by the spring means 23, connecting contacts 30 and completing a circuit placing the coil of relay 14, coils 31 of relays 22, and the coil 32 of relay 28 across the voltage of the battery 20. The energization of relay 14 closes the circuit placing the traction motors and fields 21 across the main generators. The coils 26 of relays 22, and coil 27 of relay 28 are de-energized in this position of switch 24 and consequently relay 28 is closed by coil 32 on contactor 33, thereby applying the voltage of only generators 4 and 6 across the air compressor motor 29. The relays 22 are also closed on contacts 34 by the action of coils 31, and thereby connect fields 19 of the auxiliary generator in series with resistors 35 across the battery 20. This decreases their excitation slightly as the field 21 builds up. This circuit gives an inherent voltage regulation to the auxiliary generator resulting in the desired constant voltage across either sets 4 and 6 or 5 and 7 of auxiliary generators and main generators in series.

Under these conditions the auxiliary blower motors 36 and 37 for the radiators and blower motors 38 and 39 for the traction motors 10, 11, 12 and 13 are connected across a set of auxiliary generator and main generator in series and are therefore supplied with electrical power at a substantially constant voltage irrespective of the load on the main generators. In view of the foregoing description it may be seen that I have provided a self-propelled vehicle wherein auxiliaries are supplied by a substantially constant voltage source of power irrespective of the load on the main generators and that I have also provided a means of obtaining sufficient voltage to operate an air compressor motor when the engines are idling.

While I have illustrated and described one embodiment of my invention, modifications thereof will occur to those skilled in the art. I desire it to be understood, therefore, that my invention is not to be limited to the particular arrangement disclosed, and I intend in the appended claims to cover all modifications which do not depart from the spirit and scope of my invention.

What I claim as new and desire to secure by Letters Patent of the United States, is:

1. A power system having an engine, a generator driven by said engine and having a drooping voltage characteristic, a motor, means for connecting said motor to said generator, an auxiliary generator connected in series with said generator and having a rising voltage characteristic such that the sum of the voltages of said generator and said auxiliary generator is substantially constant, and an auxiliary load connected across said generator and said auxiliary generator in series for operation independent of the load on said generator.

2. A power system having an engine, a generator driven by said engine, a motor, means for connecting said motor to said generator, said generator having an excitation system including a self-excited shunt field exciting winding giving the generator a differential voltage characteristic, an auxiliary generator having a separately-excited field and also a cumulatively connected field exciting winding connected in a circuit with said motor giving the auxiliary generator a rising voltage characteristic such that the sum of the voltages of said generator and said auxiliary generator is substantially constant, and an auxiliary load connected across said generator and said auxiliary generator in series for operation independent of the load on said generator.

3. A power system having a plurality of generators, means for driving said generators, a motor, means for connecting said motor to said generators, an auxiliary motor, means for connecting said auxiliary motor across certain of said generators when their voltage is sufficient to properly operate the same, and means for connecting said auxiliary motor across all of said generators when the voltage of said certain generator falls below the voltage required for the normal operation of said auxiliary motor.

4. A power system having a plurality of main generators each having a drooping voltage characteristic, means for driving said main generators, each of said main generators having an auxiliary generator connected in series therewith, said auxiliary generators having a rising voltage characteristic such that the sum of the voltage of each of said main generators and its auxiliary generator is substantially constant, an auxiliary motor, means for connecting said auxiliary motor across one of said main generators and one of said auxiliary generators in series for operation independent of the load on said main generator, and means for connecting said auxiliary motor across all of said generators in series when said driving means is operating at idling speed.

5. A power system having an engine, a main generator and an auxiliary generator connected in series and driven by said engine, a motor, means for connecting said motor to said main generator, an excitation system for said main generator including a self-excited shunt field exciting winding giving the generator a drooping voltage characteristic, and a cumulatively connected field winding connected across said main and auxiliary generators in series giving a separately excited effect to the voltage characteristic of said main generator, said auxiliary generator having an excitation system including a separately excited field exciting winding and a cumulatively connected field exciting winding in series with said motor giving the auxiliary generator an inherent voltage characteristic which varies with and according to the load variations on the main generator in such manner that the sum of the voltages of said main and auxiliary generator is substantially constant, and auxiliaries connected across said main and auxiliary generators for operation independent of the load on said main generator.

6. A power system having an engine, main generators and auxiliary generators connected in series and driven by said engine, a motor, means for connecting said motor to said main generators, an excitation system for said main generators including a self-excited shunt field exciting winding giving the generators a drooping voltage characteristic and a cumulatively connected field exciting winding connected across said main and auxiliary generators in series, an excitation system for said auxiliary generators including a separately excited field exciting winding and means for increasing the field strength of said separately excited winding when the engines are idling above the excitation thereof when the engine is loaded, a cumulatively connected field winding in series with said motor giving the auxiliary generators a voltage characteristic which varies with variations in the load on the main generators in such manner that the sum of the voltages of said main and auxiliary generators remains substantially constant irrespective of the load on said main generators, auxiliaries connected across said main and auxiliary generators in series for operation from a substantially constant voltage source supplied by them, and other auxiliaries having means for connecting them across one of said main generators and an auxiliary generator in series for operation independent of the load on said main generator, said means also providing for the connection of said latter auxiliaries across all of said generators in series when said engines are idling.

In witness whereof, I have hereunto set my hand this 23 day of December, 1930.

ERROL W. BRANDENSTEIN.